United States Patent
Vargas et al.

(10) Patent No.: US 9,454,685 B2
(45) Date of Patent: *Sep. 27, 2016

(54) PORTABLE RFID READING TERMINAL WITH VISUAL INDICATION OF SCAN TRACE

(71) Applicant: HAND HELD PRODUCTS, INC., Fort Mill, SC (US)

(72) Inventors: Joseph Vargas, Santa Fe, NM (US); Tom Plocher, Hugo, MN (US); Ynjiun Paul Wang, Cupertino, CA (US); Sriharsha Putrevu, Minneapolis, MN (US); Philip Zumsteg, Excelsior, MN (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/009,986

(22) Filed: Jan. 29, 2016

(65) Prior Publication Data

US 2016/0148028 A1    May 26, 2016

Related U.S. Application Data

(63) Continuation of application No. 14/717,353, filed on May 20, 2015, now Pat. No. 9,256,853, which is a continuation of application No. 13/359,005, filed on Jan. 26, 2012, now Pat. No. 9,041,518.

(51) Int. Cl.
*H04Q 5/22*      (2006.01)
*G08B 13/14*    (2006.01)
(Continued)

(52) U.S. Cl.
CPC ....... *G06K 7/10386* (2013.01); *G06K 7/10475* (2013.01); *G06Q 10/087* (2013.01); *G06Q 10/0875* (2013.01)

(58) Field of Classification Search
CPC .............. G06K 7/0008; G06K 7/0004; E05B 73/0017; B60K 35/00; G09F 19/18; G03B 21/00
USPC ............. 340/572.1–572.9, 10.1–10.6, 691.6, 340/815; 353/28, 46; 235/440, 491, 492; 343/757, 765; 345/173
See application file for complete search history.

(56) References Cited

U.S. PATENT DOCUMENTS 6,000,615 A * 12/1999 Spitz ........................ G06K 7/14 235/432
6,318,636 B1    11/2001 Reynolds et al.
(Continued)

OTHER PUBLICATIONS

May 2, 2016 US Office Action Issued in U.S. Appl. No. 14/862,702.
(Continued)

*Primary Examiner* — Andrew Bee
*Assistant Examiner* — Munear Akki
(74) *Attorney, Agent, or Firm* — Oliff PLC; R. Brian Drozd

(57) ABSTRACT

A portable radio-frequency identifier (RFID) reading terminal can comprise a microprocessor, a memory, an RFID reading device, and a display. The portable RFID reading terminal can be configured to display a scan trace provided by a line comprising a plurality of time varying points. Each point can be defined by a projection of a radio frequency (RF) signal coverage shape of the RFID reading device onto a chosen plane at a given moment in time.

20 Claims, 21 Drawing Sheets

(51) Int. Cl.
   *G08B 7/00*     (2006.01)
   *G03B 21/26*    (2006.01)
   *G06K 7/00*     (2006.01)
   *G06K 7/10*     (2006.01)
   *G06Q 10/08*    (2012.01)

(56) References Cited

U.S. PATENT DOCUMENTS

| | | | |
|---|---|---|---|
| 6,543,691 B1 | 4/2003 | Lemelson et al. | |
| 6,659,344 B2 | 12/2003 | Otto et al. | |
| 6,991,164 B2* | 1/2006 | Lemelson | G06K 7/14 235/449 |
| 7,003,138 B2 | 2/2006 | Wilson | |
| 7,015,967 B1 | 3/2006 | Kochi et al. | |
| 7,063,256 B2 | 6/2006 | Anderson et al. | |
| 7,161,470 B2* | 1/2007 | Berquist | G06K 7/10079 340/10.31 |
| 7,237,721 B2 | 7/2007 | Bilcu et al. | |
| 7,243,849 B2 | 7/2007 | Lapstun et al. | |
| 7,270,268 B2 | 9/2007 | Garber et al. | |
| 7,308,158 B2 | 12/2007 | Herbert et al. | |
| 7,405,662 B2 | 7/2008 | Steinke et al. | |
| 7,407,096 B2 | 8/2008 | McQueen et al. | |
| 7,494,063 B2 | 2/2009 | Kotlarsky et al. | |
| 7,501,950 B2 | 3/2009 | Suzuki | |
| 7,535,361 B2 | 5/2009 | Doan et al. | |
| 7,551,090 B2 | 6/2009 | Doan et al. | |
| 7,602,288 B2 | 10/2009 | Broussard | |
| 7,627,191 B2 | 12/2009 | Xu et al. | |
| 7,677,602 B2 | 3/2010 | Bennett et al. | |
| 7,696,874 B2 | 4/2010 | Stevens | |
| 7,702,187 B2 | 4/2010 | Rusman et al. | |
| 7,708,205 B2 | 5/2010 | Kotlarsky et al. | |
| 7,735,731 B2 | 6/2010 | Skaaksrud et al. | |
| 7,756,292 B2 | 7/2010 | Lev | |
| 7,756,319 B2 | 7/2010 | Odell | |
| 7,786,865 B2 | 8/2010 | Park | |
| 7,786,925 B1 | 8/2010 | Knibbe et al. | |
| 7,815,121 B2 | 10/2010 | Kotlarsky et al. | |
| 7,821,400 B2 | 10/2010 | Tabet et al. | |
| 7,831,082 B2 | 11/2010 | Holsing et al. | |
| 7,833,013 B2 | 11/2010 | Diers et al. | |
| 7,855,643 B2 | 12/2010 | Tuttle | |
| 7,857,219 B2 | 12/2010 | Lackemann | |
| 7,870,999 B2 | 1/2011 | Skaaksrud et al. | |
| 7,883,013 B2 | 2/2011 | Skaaksrud et al. | |
| 7,886,972 B2 | 2/2011 | Skaaksrud et al. | |
| 7,951,003 B2 | 5/2011 | Russell et al. | |
| 7,961,908 B2 | 6/2011 | Tzur et al. | |
| 7,965,186 B2 | 6/2011 | Downie et al. | |
| 8,115,601 B2 | 2/2012 | Nonaka | |
| 8,149,094 B2 | 4/2012 | Deoalikar et al. | |
| 8,508,344 B2* | 8/2013 | Hiramatu | G06Q 10/087 235/385 |
| 8,727,225 B2 | 5/2014 | Zumsteg et al. | |
| 8,881,982 B2 | 11/2014 | Zumsteg et al. | |
| 9,013,275 B2 | 4/2015 | Zumsteg | |
| 9,041,518 B2 | 5/2015 | Vargas et al. | |
| 9,064,254 B2 | 6/2015 | Todeschini et al. | |
| 9,092,683 B2 | 7/2015 | Koziol et al. | |
| 2002/0033805 A1 | 3/2002 | Fujioka et al. | |
| 2002/0165758 A1 | 11/2002 | Hind et al. | |
| 2004/0041029 A1 | 3/2004 | Postman et al. | |
| 2005/0131645 A1 | 6/2005 | Panopoulos | |
| 2005/0212676 A1* | 9/2005 | Steinberg | G06K 7/10079 340/572.8 |
| 2005/0212817 A1 | 9/2005 | Cannon et al. | |
| 2006/0026961 A1 | 2/2006 | Bronicki | |
| 2006/0208859 A1* | 9/2006 | Hougen | G06K 7/0008 340/10.1 |
| 2006/0262961 A1 | 11/2006 | Holsing et al. | |
| 2006/0266836 A1 | 11/2006 | Bilcu et al. | |
| 2007/0008136 A1 | 1/2007 | Suzuki | |
| 2007/0102506 A1 | 5/2007 | Stevens | |
| 2007/0124216 A1 | 5/2007 | Lucas | |
| 2007/0140525 A1 | 6/2007 | Kottomtharayil | |
| 2007/0176572 A1 | 8/2007 | Dang et al. | |
| 2007/0199995 A1 | 8/2007 | Kotlarsky et al. | |
| 2007/0215706 A1 | 9/2007 | Kotlarsky et al. | |
| 2008/0037899 A1 | 2/2008 | Xu et al. | |
| 2008/0061937 A1 | 3/2008 | Park | |
| 2008/0111661 A1 | 5/2008 | Lin et al. | |
| 2008/0122785 A1 | 5/2008 | Harmon | |
| 2008/0164313 A1 | 7/2008 | Kotlarsky et al. | |
| 2008/0164317 A1 | 7/2008 | Kotlarsky et al. | |
| 2008/0169343 A1 | 7/2008 | Skaaksrud et al. | |
| 2008/0172303 A1 | 7/2008 | Skaaksrud et al. | |
| 2008/0173706 A1 | 7/2008 | Skaaksrud et al. | |
| 2008/0173710 A1 | 7/2008 | Skaaksrud et al. | |
| 2008/0203147 A1 | 8/2008 | Skaaksrud et al. | |
| 2008/0203166 A1 | 8/2008 | Skaaksrud et al. | |
| 2008/0210749 A1 | 9/2008 | Skaaksrud et al. | |
| 2008/0210750 A1 | 9/2008 | Skaaksrud et al. | |
| 2008/0215286 A1 | 9/2008 | Mealy et al. | |
| 2008/0224870 A1 | 9/2008 | Yeo et al. | |
| 2008/0249899 A1* | 10/2008 | Nasser | G06Q 10/087 705/28 |
| 2008/0285091 A1 | 11/2008 | Skaaksrud et al. | |
| 2009/0021353 A1 | 1/2009 | Nonaka | |
| 2009/0040025 A1 | 2/2009 | Volpi et al. | |
| 2009/0045913 A1 | 2/2009 | Nelson et al. | |
| 2009/0045924 A1 | 2/2009 | Roberts, Sr. et al. | |
| 2009/0121025 A1 | 5/2009 | Romanchik | |
| 2009/0161964 A1 | 6/2009 | Tzur et al. | |
| 2009/0243801 A1 | 10/2009 | Strzelczyk | |
| 2009/0245755 A1 | 10/2009 | Lee et al. | |
| 2009/0322537 A1 | 12/2009 | Tapp et al. | |
| 2010/0045436 A1 | 2/2010 | Rinkes | |
| 2010/0073487 A1 | 3/2010 | Sogoh et al. | |
| 2010/0109844 A1 | 5/2010 | Carrick et al. | |
| 2010/0109903 A1 | 5/2010 | Carrick | |
| 2010/0142825 A1 | 6/2010 | Maxwell et al. | |
| 2010/0148985 A1 | 6/2010 | Lin et al. | |
| 2010/0201488 A1 | 8/2010 | Stern et al. | |
| 2010/0201520 A1 | 8/2010 | Stern et al. | |
| 2010/0220894 A1 | 9/2010 | Ackley et al. | |
| 2010/0226530 A1 | 9/2010 | Lev | |
| 2010/0232712 A1 | 9/2010 | Tomita et al. | |
| 2010/0252621 A1 | 10/2010 | Ito et al. | |
| 2010/0262554 A1* | 10/2010 | Elliott | G01C 21/20 705/323 |
| 2010/0271187 A1 | 10/2010 | Uysal et al. | |
| 2010/0289624 A1* | 11/2010 | Nakamura | G01S 3/046 340/10.3 |
| 2010/0296753 A1 | 11/2010 | Ito et al. | |
| 2010/0303348 A1 | 12/2010 | Tolliver et al. | |
| 2010/0308964 A1 | 12/2010 | Ackley et al. | |
| 2011/0052008 A1 | 3/2011 | Holsing et al. | |
| 2011/0080267 A1 | 4/2011 | Clare et al. | |
| 2011/0084808 A1 | 4/2011 | Tuttle | |
| 2011/0115947 A1 | 5/2011 | Oh | |
| 2011/0128125 A1 | 6/2011 | Kai et al. | |
| 2011/0143811 A1 | 6/2011 | Rodriguez | |
| 2011/0175933 A1 | 7/2011 | Soeda | |
| 2011/0187600 A1 | 8/2011 | Landt | |
| 2011/0205387 A1 | 8/2011 | Tzur et al. | |
| 2011/0212717 A1 | 9/2011 | Rhoads et al. | |
| 2011/0234398 A1 | 9/2011 | Romaine et al. | |
| 2011/0266342 A1 | 11/2011 | Forster | |
| 2011/0280447 A1 | 11/2011 | Conwell | |
| 2011/0284625 A1 | 11/2011 | Smith et al. | |
| 2011/0290883 A1 | 12/2011 | Kotlarsky et al. | |
| 2011/0297654 A1 | 12/2011 | Yoshikawa et al. | |
| 2011/0298610 A1* | 12/2011 | Etkin | H04L 29/08792 340/539.3 |
| 2012/0091204 A1* | 4/2012 | Shi | G06K 7/1465 235/437 |
| 2012/0161944 A1 | 6/2012 | Chen | |
| 2012/0200537 A1 | 8/2012 | Okano | |
| 2013/0049962 A1 | 2/2013 | Smith et al. | |
| 2013/0154809 A1* | 6/2013 | Subramanian | G01S 13/878 340/10.42 |
| 2013/0173435 A1* | 7/2013 | Cozad, Jr. | G06Q 10/087 705/28 |

(56) References Cited

U.S. PATENT DOCUMENTS

| | | |
|---|---|---|
| 2013/0194077 A1 | 8/2013 | Vargas et al. |
| 2013/0277427 A1 | 10/2013 | Zumsteg et al. |
| 2013/0277430 A1 | 10/2013 | Zumsteg et al. |
| 2013/0278386 A1 | 10/2013 | Zumsteg |
| 2013/0278393 A1 | 10/2013 | Zumsteg |
| 2013/0306720 A1 | 11/2013 | Todeschini et al. |
| 2014/0014724 A1 | 1/2014 | Koziol et al. |
| 2014/0022608 A1 | 1/2014 | Yasuzaki |
| 2014/0027503 A1 | 1/2014 | Kennedy et al. |
| 2014/0097247 A1 | 4/2014 | Zumsteg |
| 2014/0104416 A1 * | 4/2014 | Giordano ............... G01B 11/02 348/135 |
| 2014/0203079 A1 | 7/2014 | Zumsteg et al. |
| 2015/0254607 A1 | 9/2015 | Vargas et al. |
| 2016/0034724 A1 | 2/2016 | Zumsteg |

OTHER PUBLICATIONS

EPC Global, Specification for RFID Air Interface, EPC Radio-Frequency Identity Protocols Clas-1 Generation-2 UHF RFID Protocol for Communications at 860 MHz-960 MHz, Version 1.0.9, Jan. 31, 2005, pp. 1-94.

May 27, 2016 Search Report issued in European Patent Application No. 15202688.6.

Jul. 19, 2016 Office Action Issued in U.S. Appl. No. 14/982,839.

\* cited by examiner

Transparent = not fully reconciled

PORTABLE RFID READING TERMINAL WITH VISUAL INDICATION OF SCAN TRACE

This is a Continuation of application Ser. No. 14/717,353 filed May 20, 2015, which is a Continuation of application Ser. No. 13/359,005 filed Jan. 26, 2012. The disclosure of the prior applications are hereby incorporated by reference herein in their entirety.

FIELD OF THE INVENTION

The invention is generally related to encoded information reading (EIR) terminals and is specifically related to RFID reading terminals including radio-frequency identification (RFID) reading devices.

BACKGROUND OF THE INVENTION

RFID methods are widely used in a number of applications, including smart cards, item tracking in manufacturing, inventory management in retail, etc. An RFID tag can be attached, e.g., to an inventory item. An RFID reading terminal can be configured to read the memory of an RFID tag attached to an inventory item.

SUMMARY OF THE INVENTION

In one embodiment, there is provided a portable radio-frequency identifier (RFID) reading terminal comprising a microprocessor, a memory, an RFID reading device including a radio frequency (RF) antenna, and a display. The portable RFID reading terminal can be configured to display a scan trace provided by a line comprising a plurality of time varying points. Each point can be defined by a projection of the coverage shape of an RF signal transmitted by the RFID reading device onto a chosen plane at a given moment in time.

In one embodiment, the portable RFID reading terminal can, by reading RFID tags attached to the items, reconcile a count of items stored in a manufacturing, retail, and/or storage facility against an expected count which can be received, e.g., from an external computer. In another embodiment, the portable RFID reading terminal can, by reading RFID tags attached to the items, reconcile an inventory of items stored in a manufacturing, retail, and/or storage facility against an expected inventory list received, e.g., from an external computer. In a further aspect, the portable RFID reading terminal can transmit to the external computer the list or the count of read RFID tags.

In one embodiment, the portable RFID reading terminal can further comprise a two-dimensional imager. The portable RFID reading terminal can be further configured to determine a spatial position of the RF signal coverage shape based on a known position and orientation of the RF antenna relative to the position of the field of view of the two-dimensional imager.

In one embodiment, the portable RFID reading terminal can be further configured to measure a distance to an object using the two-dimensional imager. The portable RFID reading terminal can be further configured to determine and display the projection of the RF signal coverage shape onto the plane defined by the physical structure which in one embodiment can contain a plurality of inventory items.

In one embodiment, the portable RFID reading terminal can further comprise at least one accelerometer. The portable RFID reading terminal can be further configured to determine a change of the spatial position and orientation of the RF signal coverage shape based on the proper acceleration values received from the accelerometer.

In one embodiment, the portable RFID reading terminal can be configured to display a quantity of scanned items, a quantity of items which have not be scanned yet, and/or a total quantity of items to be scanned.

In one embodiment, the portable RFID reading terminal can be configured to display an indicator of a ratio of quantity of scanned items to a total quantity of items to be scanned.

In one embodiment, the portable RFID reading terminal can be configured to display a scan trace overlaid over an image of a physical structure which can contain one or more scanned items and/or one or more items to be scanned. In a further aspect, the image of the physical structure can be acquired by the two-dimensional imager or received from an external computer. In one embodiment, portable RFID reading terminal can be configured to receive a description of the physical structure, and create an image of the physical structure based on the description.

In one embodiment, the portable RFID reading terminal can be configured to display an indicator of an RF signal coverage over a scan trace overlaid over an image of a physical structure.

In one embodiment, the portable RFID reading terminal can be configured to display an indicator of an RF signal coverage over a current position within the scan trace.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
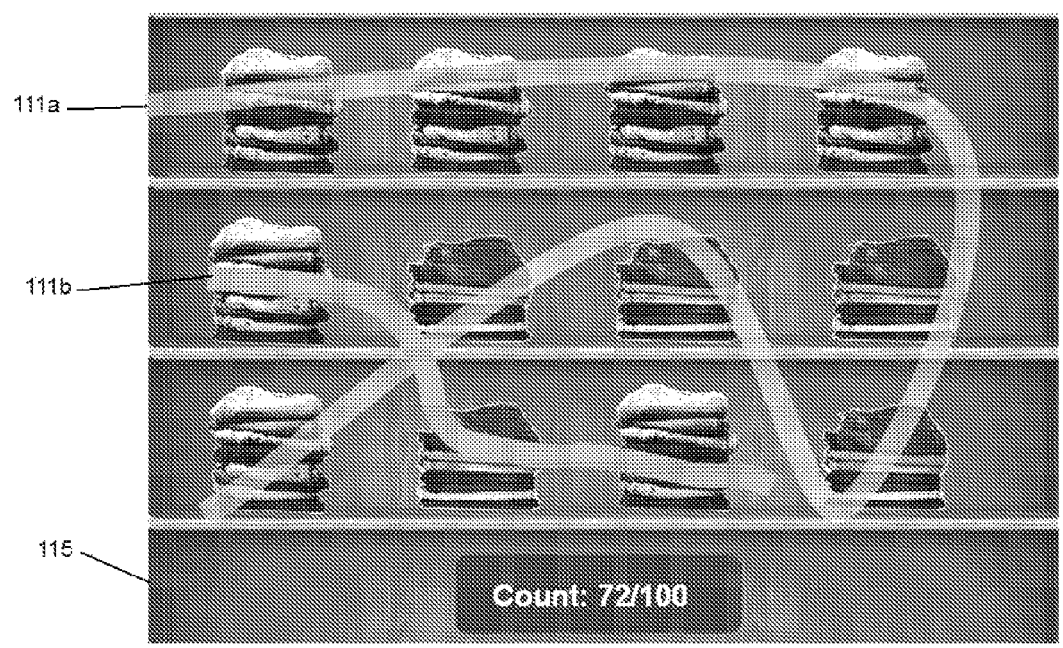
FIG. 1 schematically illustrates a scan trace displayed by an RFID reading terminal.

RFID reading devices usually offer improved efficiency over barcode scanning devices for retail inventory, by being capable of reading multiple RFID tags that are within range of the RF signal transmitted by an RFID reading device. A downside to this multiple-read capability is lack of scanned items localization, due to insufficient correlation between where the RFID reader is located or oriented, and the RFID tags being read. Retail inventory management typically requires more than 90% of the RFID tags present in a department to be successfully acquired during the inventory process. When this high accuracy is not achieved, it is necessary to rescan the entire department, since the locations of any unread RFID tags are unknown.

In one embodiment, there is provided a portable radio-frequency identifier (RFID) reading terminal configured to present a visual indication of defined areas which have been scanned and areas which have not been scanned for RFID tags. Such a capability provides increased operational efficiency of RFID tag reading for retail inventory management. Various embodiments of the RFID reading terminal can be used in a numerous applications, including but not limited to, item tracking in manufacturing, storage, and retail, real-time inventory control systems, etc.

Item tracking and/or inventory control can be implemented by placing an RFID tag on each inventory item. The RFID reading terminal can comprise at least one RFID reading device which can be configured to read and/or modify a memory of an RFID tag containing an encoded message. The RFID reading device can transmit and/or receive radio frequency (RF) signals to and from RFID tags attached to inventory items. Each RFID tag can store the tag identifier in its memory. An RFID tag attached to an inventory item can further store in the tag's memory a product code of the item, an EPC (Electronic Product Code) of the item, and/or at least one alphanumeric string identifying the item.

The RFID reading device can be further configured to output decoded message data corresponding to the encoded message, e.g., decoded message data containing identifiers of the items to which the RFID tags are attached. The RFID reading terminal can be configured to store in its memory and/or transmit to an external computer the item identifiers received from the plurality of RFID tags.

In a further aspect, the RFID reading terminal can be configured to receive an expected count of inventory items or an expected inventory list of items of interest stored within a storage, manufacturing, and/or retail facility. As used herein, "inventory list" shall refer to a collection of item descriptions, each item description comprising at least the item identifier.

In one embodiment, the RFID reading terminal can receive the expected count of inventory items or the expected inventory list over a network from an external computer. In another embodiment, the RFID reading terminal can receive the expected count of inventory items or the expected inventory list via the user interface. In a yet another embodiment, the RFID reading terminal can receive the expected count of inventory items or the expected inventory list by reading an external memory device connected to one of the terminal's I/O ports (e.g., a USB port, or a PCMCIA interface). In a yet another embodiment, the RFID reading terminal can be equipped with a 2D imager and can receive the expected count of inventory items or the expected inventory list via the 2D imager, for example, by scanning a plurality of optical decodable indicia (e.g., a plurality of bar codes), or by acquiring an image of a textual document containing the expected count of inventory items or the expected inventory list and then processing the image using optical character recognition (OCR) methods.

The RFID reading terminal can be further configured to reconcile the inventory of items stored within a storage, manufacturing, and/or retail facility against the expected count of inventory items or the expected inventory list by reading the RFID tags attached to the inventory items.

The RFID reading terminal can read RFID tags from a range of distances and various terminal orientations with respect to an RFID tag being read. To further improve the reliability of scanning operations and the terminal's operator experience, the RFID reading terminal can be configured to emit audible signals (e.g., beeps) to indicate an occurrence of a pre-defined event, thus providing an audible feedback to the operator of the RFID reading terminal. In one embodiment, the RFID reading terminal can be configured to emit an audible signal of a first type every time a unique RFID tag has been successfully read and reconciled against an inventory list. The RFID reading terminal can be further configured to and emit an audible signal of a second type every time a unique RFID tag has been successfully read but failed to reconcile against the inventory list. The RFID reading terminal can be further configured to emit an audible signal of a third type every time a pre-defined timeout has elapsed without reading an RFID tag. However, the audible feedback inherently fails to indicate the location of the RFID tag having been successfully read.

To further improve the readability of scanning operations, the RFID reading terminal can in one embodiment be configured to display on the terminal's display one or more scan traces, thus providing the terminal's operator with a visual feedback with respect to the scanning progress, as schematically shown in FIG. 1.

Figure 2:
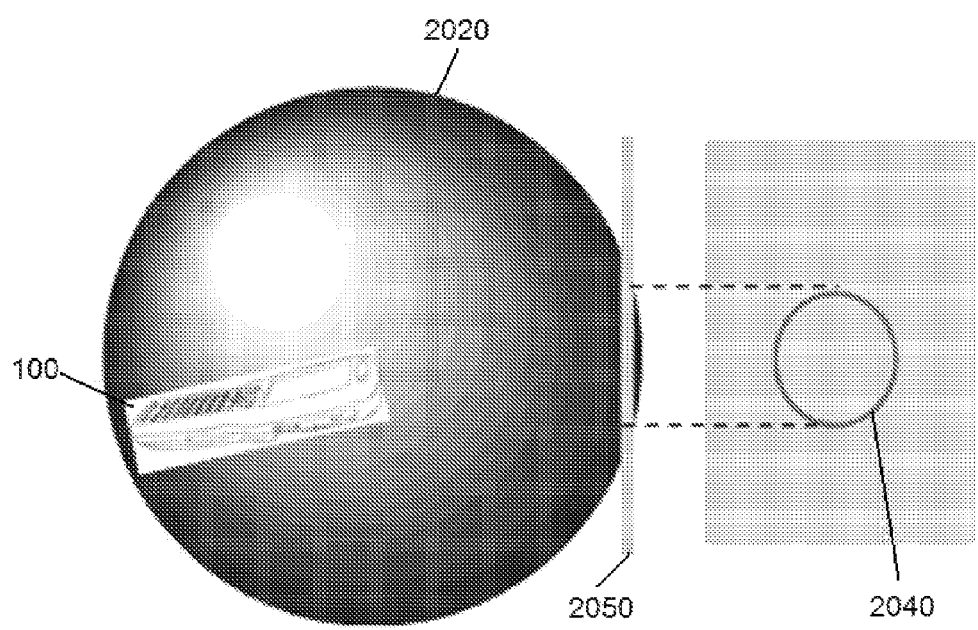
FIG. 2 schematically illustrates an RF signal coverage shape by the RFID reading terminal.

At any moment in time, the RF signal coverage emitted by an RFID reading terminal can be defined by a 3D shape, as schematically shown in FIG. 2. The form and size of the 3D shape defining the RF signal coverage can depend, among other factors, on the RFID transmit power level and the number and configuration of the RF antennas employed by the RFID reading device. In one embodiment, the 3D signal coverage shape can be provided by a sphere 2020. In another embodiment, the 3D signal coverage shape can be provided by an ellipsoid. In a yet another embodiment, the 3D signal coverage shape can be provided by a cone.

At any given moment in time, a target scan area by an RFID reading terminal can be visualized as a projection 2040 of the 3D RF signal coverage shape 2020 onto an arbitrarily chosen plane 2050, including an imaginary plane. For a moving RFID reading terminal, a visual scan trace can be provided by a line defined by a multitude of time varying points, each point being a projection 2040 of the 3D RF signal coverage shape 2020 onto the arbitrarily chosen plane 2050 at a given moment in time.

In a further aspect, the imaginary plane onto which the visual scan trace is projected can be chosen to intersect a physical structure (e.g., a shelf) containing the inventory items, and thus the scan trace can be overlaid over an image of the physical structure as schematically shown in FIG. 1.

Figure 3:
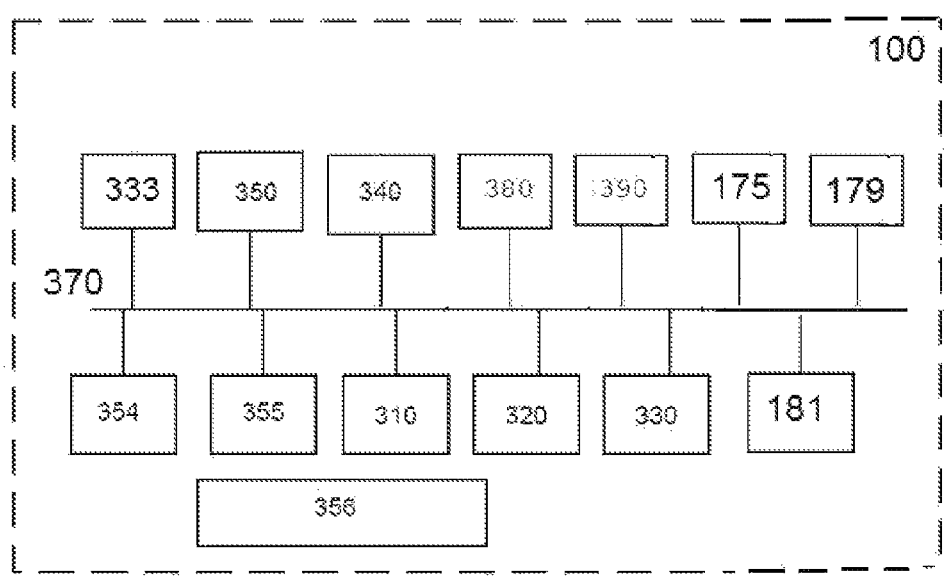
FIG. 3 schematically illustrates a component-level diagram of one embodiment of the RFID reading terminal.

Component-level diagram of one embodiment of the RFID reading terminal is now being described with references to FIG. 3. The RFID reading terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, RFID reading terminal 100 can comprise a single microprocessor which can be referred to as a central processing unit (CPU). In another embodiment, RFID reading terminal 100 can comprise two or more microprocessors, for example, a CPU providing some or most of the RFID reading terminal functionality and a specialized microprocessor performing some specific functionality. A skilled artisan would appreciate the fact that other schemes of processing tasks distribution among two or more microprocessors are within the scope of this disclosure.

RFID reading terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

RFID reading terminal 100 can further comprise a battery 356. In one embodiment, the battery 356 can be provided by a replaceable rechargeable battery pack. The RFID reading terminal 100 can further comprise a GPS receiver 380. The RFID reading terminal 100 can further comprise at least one connector 390 configured to receive a subscriber identity module (SIM) card.

The RFID reading terminal 100 can further comprise an imaging device 330, provided, for example, by a two-dimensional imager.

The RFID reading terminal 100 can further comprise an RFID reading device 333. In one embodiment, the RFID reading device 333 can be configured to read a memory of an RFID tag containing an encoded message and to output raw message data containing the encoded message. In another embodiment, the RFID reading device 333 can be configured to read a memory of an RFID tag containing an encoded message and to output decoded message data corresponding to the encoded message. As used herein, "message" is intended to denote a bit sequence or a character string comprising alphanumeric and/or non-alphanumeric characters. An encoded message can be used to convey information, such as identification of the source and the model of an item, for example, in an EPC code.

In one embodiment, the RFID reading terminal 100 can further comprise a graphical user interface including a display adapter 175 and a keyboard 179. In one embodiment, the RFID reading terminal 100 can further comprise an audio output device, e.g., a speaker 181.

It is not necessary that a device's primary function involve reading RFID tags in order to be considered an RFID reading terminal; for example, a cellular telephone, a smart phone, a PDA, or other portable computing device that is capable of reading RFID tags can be referred to as an RFID reading terminal for purposes of this disclosure.

Figure 4:
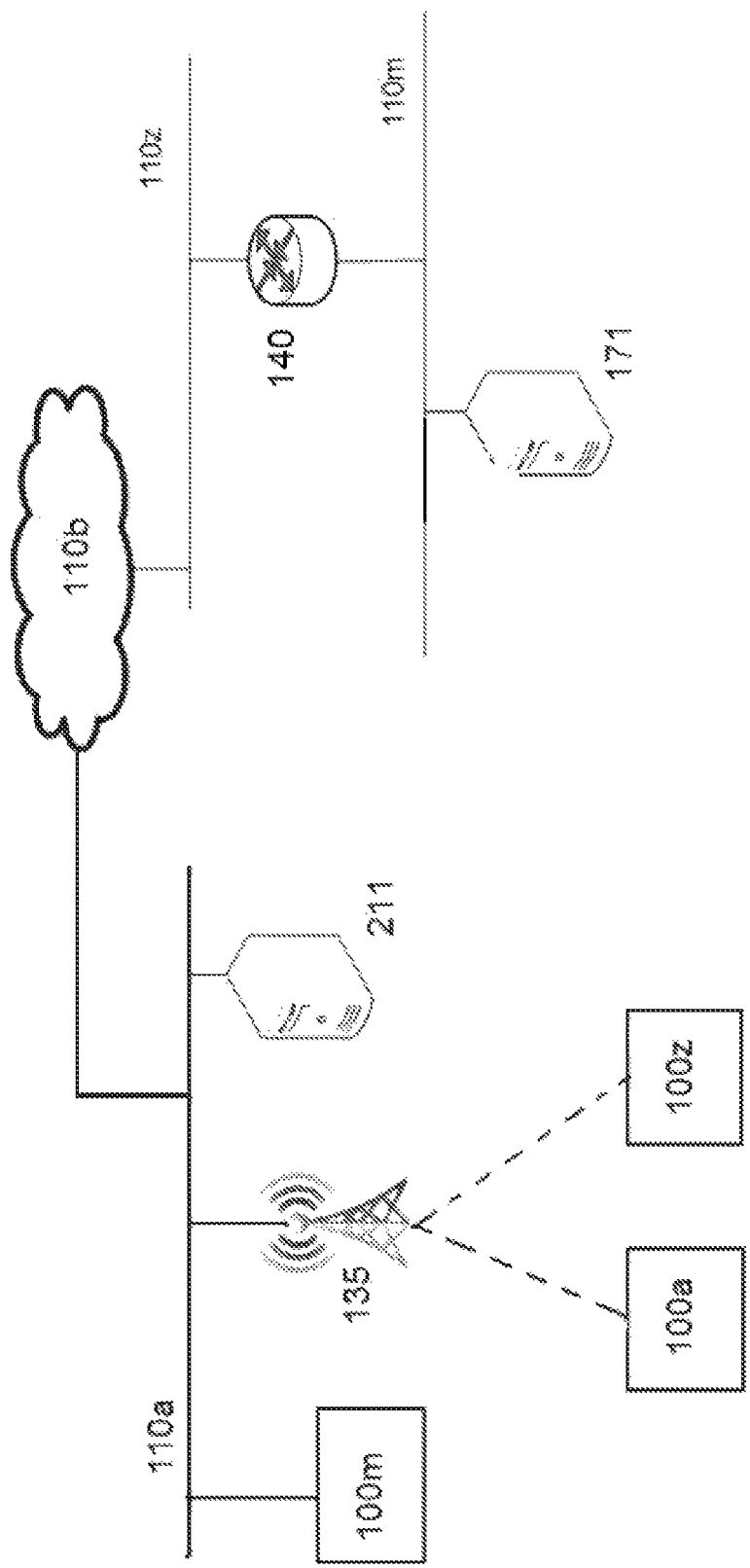
FIG. 4 schematically illustrates a network diagram of one embodiment of a data collection system employing RFID reading terminals.

In a further aspect, the RFID reading terminal can be incorporated in a data collection system. One embodiment of the data collection system, schematically shown in FIG. 4, can include a plurality of RFID reading terminals 100a-100z in communication with a plurality of interconnected networks 110a-110z.

An RFID reading terminal 100a-100z can establish a communication session with an external computer 171. In one embodiment, network frames can be exchanged by the RFID reading terminal 100 and the external computer 171 via one or more routers 140, access points 135, and other infrastructure elements. In another embodiment, the external computer 171 can be reachable by the RFID reading terminal 100 via a local area network (LAN). In a yet another embodiment, the external computer 171 can be reachable by the RFID reading terminal 100 via a wide area network (WAN). In a yet another embodiment, the external computer 171 can be reachable by the RFID reading terminal 100 directly (e.g., via a wired or wireless interface). A skilled artisan would appreciate the fact that other methods of providing interconnectivity between the RFID reading terminal 100 and the external computer 171 relying upon LANs, WANs, virtual private networks (VPNs), and/or other types of network are within the scope of this disclosure.

A "computer" herein shall refer to a programmable device for data processing and control, including a central processing unit (CPU), a memory, and at least one communication interface. For example, in one embodiment, a computer can be provided by a server running a single instance of a multi-tasking operating system. In another embodiment, a computer can be provided by a virtual server, i.e., an isolated instance of a guest operating system running within a host operating system. A "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the application layer interface to the network layer of the OSI model can comprise a plurality of lower layer networks, i.e., what can be regarded as a single Internet Protocol (IP) network, can include a plurality of different physical networks.

The communications between the RFID reading terminal 100 and the external computer 171 can comprise a series of requests and responses transmitted over one or more TCP connections. A skilled artisan would appreciate the fact that using various transport and application level protocols is within the scope and the spirit of the invention.

At least one of the messages transmitted by the RFID reading terminal 100 can include decoded message data corresponding to an RFID label attached to an inventory item. For example, an RFID reading terminal can transmit a request to the external computer to retrieve product information corresponding to a product identifier encoded by an RFID tag attached to a retail item, or to transmit an item tacking record for an item identified by an RFID tag attached to the item.

As noted herein supra, the RFID reading terminal 100 can be configured to receive from the external computer 171 an inventory list containing item identifiers, or count, of items stored within a storage, manufacturing, and/or retail facility. The inventory list or count can further contain storage location information of specific items. The RFID reading terminal 100 can be further configured to reconcile an inventory of items stored in a manufacturing, retail and/or storage facility against the inventory list or count, by reading RFID tags attached to the items. The RFID reading terminal 100 can be configured to transmit the reconciled list or count to the external computer 171.

The RFID reading terminal 100 can be further configured to display a scan trace on the terminal's display, thus providing to the operator a visual feedback with respect to the scanning progress. In one embodiment, one or more scan traces 111a, 111b can be overlaid over an image of physical structure 115 containing the inventory items as schematically shown in FIG. 1. In a further aspect, for a moving RFID reading terminal, a visual scan trace can be provided by a line defined by a multitude of time varying points, each point being a projection of the 3D RF signal coverage shape onto a plane defined by the physical structure 115 containing the inventory items at a given moment in time.

Figure 5A:
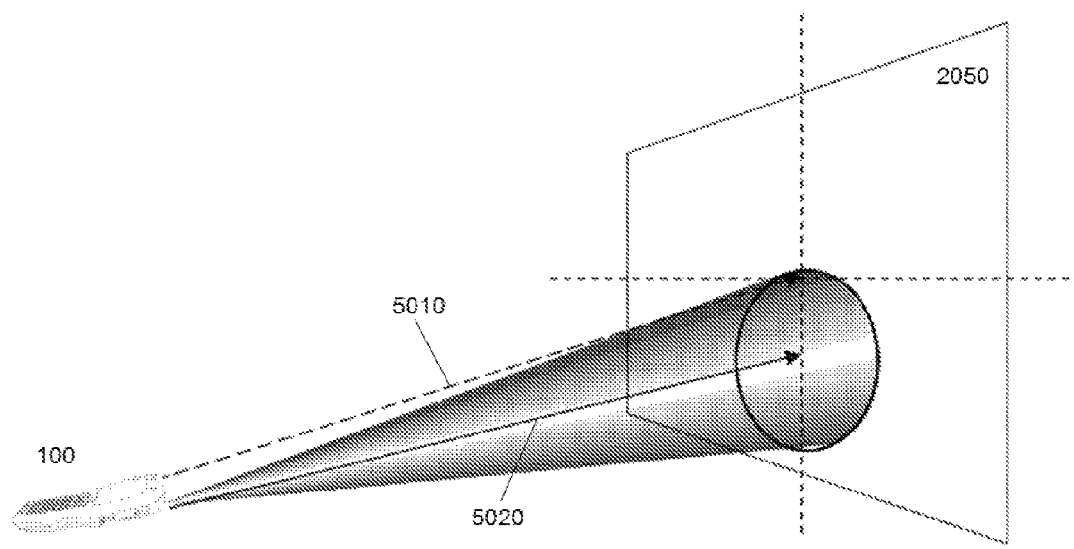
FIGS. 5a-5b schematically illustrate determining a spatial position of the RF signal coverage shape based on the known position and orientation of an RF antenna relatively to the position of the field of view of a two-dimensional imager.
Figure 5B:
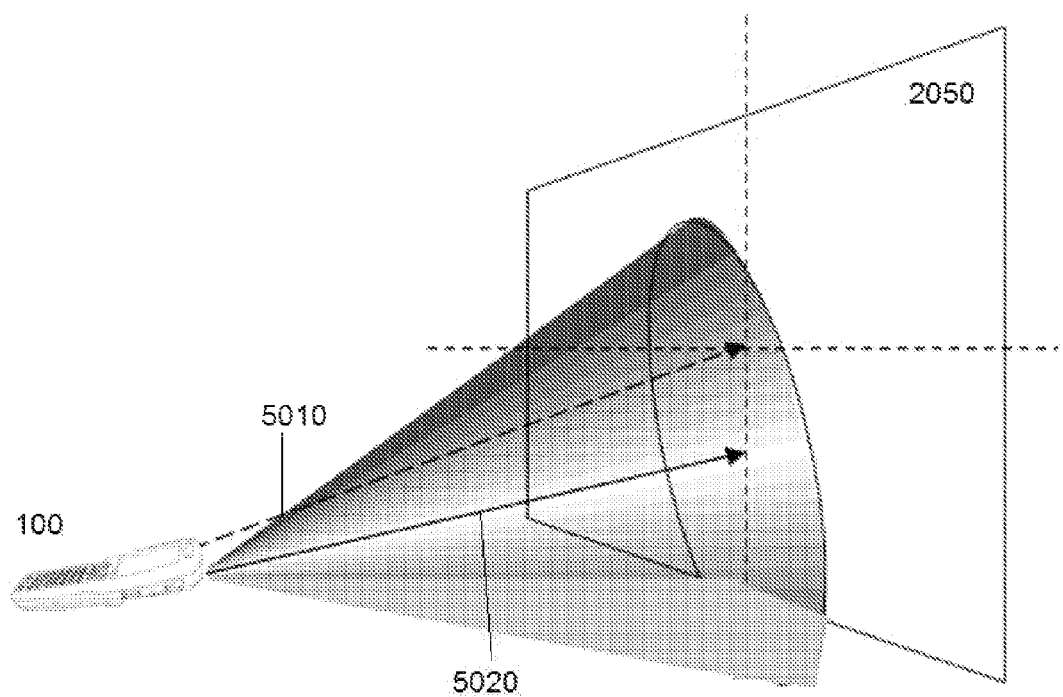

A noted herein supra, in one embodiment, the RFID reading terminal can comprise a two-dimensional imager. The RFID reading terminal can be configured to determine a spatial position of the RF signal coverage shape based on the known position and orientation of the RF antenna relatively to the position of the field of view (FOV) of the two-dimensional imager, as schematically shown in FIGS. 5a-5b.

The plane 2050 can represent an arbitrary chosen plane, e.g., a plane intersecting a physical structure hosting one or more inventory items. The RF antenna can be oriented relatively to the view finder in such a way that the central axis 5010 of the field of view of the imager would be parallel to the central axis 5020 of the RF signal coverage shape by the antenna. Reducing the distance between the RFID reading terminal and the plane 2050 and/or increasing the RF transmit power level results in a larger projection of the RF signal coverage area onto the plane 5020, as schematically shown in FIGS. 5a-5b. In the example of FIG. 5b, the lesser distance and/or the greater transmit power level results in a larger projection RF signal coverage area onto the plane 5020. The projection of the RF signal coverage shape onto the plane 2050 can be entirely within the FOV of the two-dimensional imager, as schematically shown in FIG. 5a, or can be partially outside of the FOV of the two-dimensional imager, as schematically shown in FIG. 5b.

In a further aspect, the RFID reading terminal can be configured to measure the distance to an object using a two-dimensional imager. Based on the known shape of the signal coverage and the distance and orientation of the RF antenna to a physical structure 115 containing the inventory items, the RFID reading terminal can determine and display the projection of the 3D RF signal coverage shape onto the plane defined by the physical structure 115.

In another embodiment, the RFID reading terminal can comprise one or more accelerometers and can be configured to determine the change of the spatial position and orientation of the RF signal coverage shape based on the proper acceleration values received from the accelerometers. In one illustrative embodiment, the RFID reading terminal can comprise three or more accelerometers.

Figure 6:
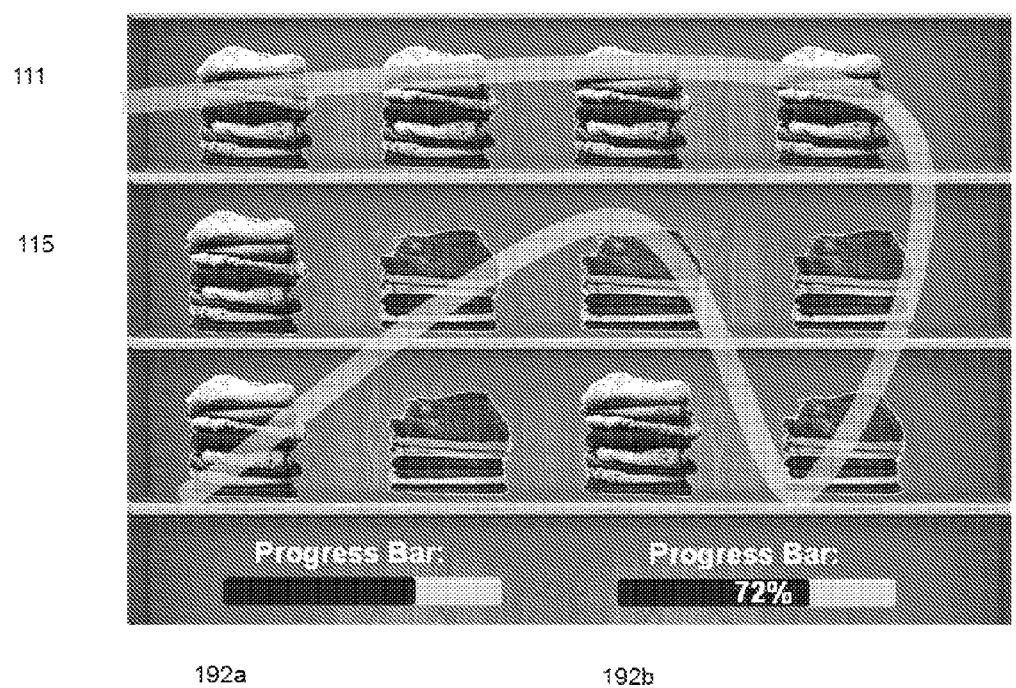
FIGS. 6-19 schematically illustrate various methods of displaying scan traces and selected inventory quantities by the RFID reading terminal.

In one embodiment, the RFID reading terminal 100 can be further configured to display a quantity of scanned items, a quantity of items which have not been scanned yet, and/or a total quantity of items to be scanned, the latter quantity determined based on an inventory count or list of items describing a storage, manufacturing, and/or retail facility. A progress indicator 191 of FIG. 1 shows the number of items scanned and the total number of items expected to be scanned. In another embodiment, the RFID reading terminal 100 can be further configured to display a both an absolute progress bar 192a, and/or a relative progress bar 192b indicating a quantity of scanned items and a total quantity of items expected to be scanned, as shown in FIG. 6.

Figure 7:
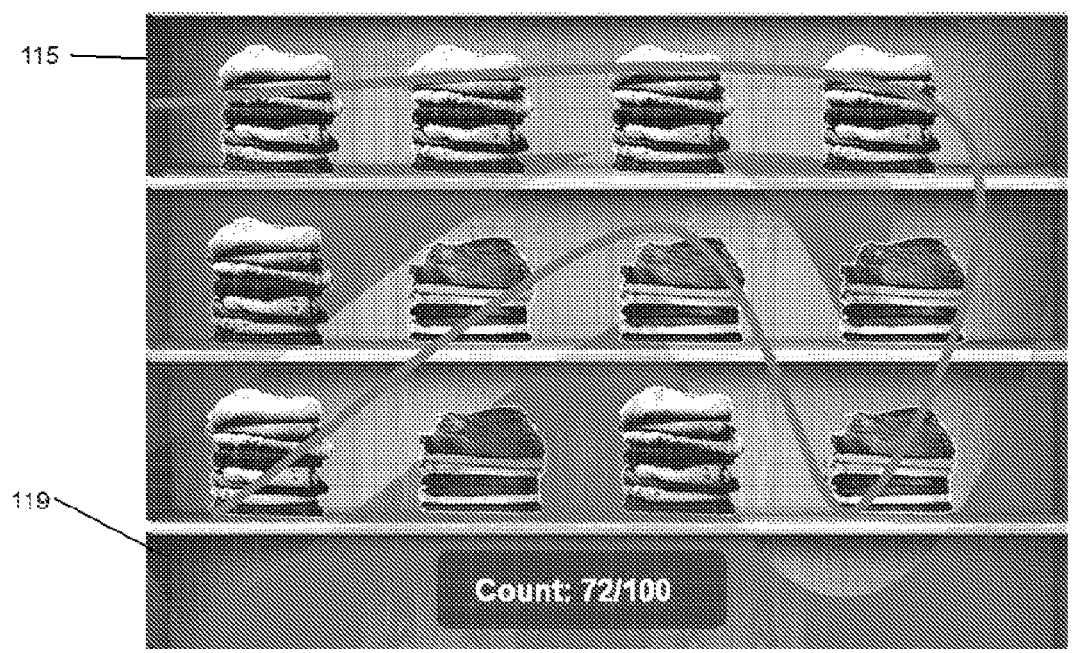
Figure 8:
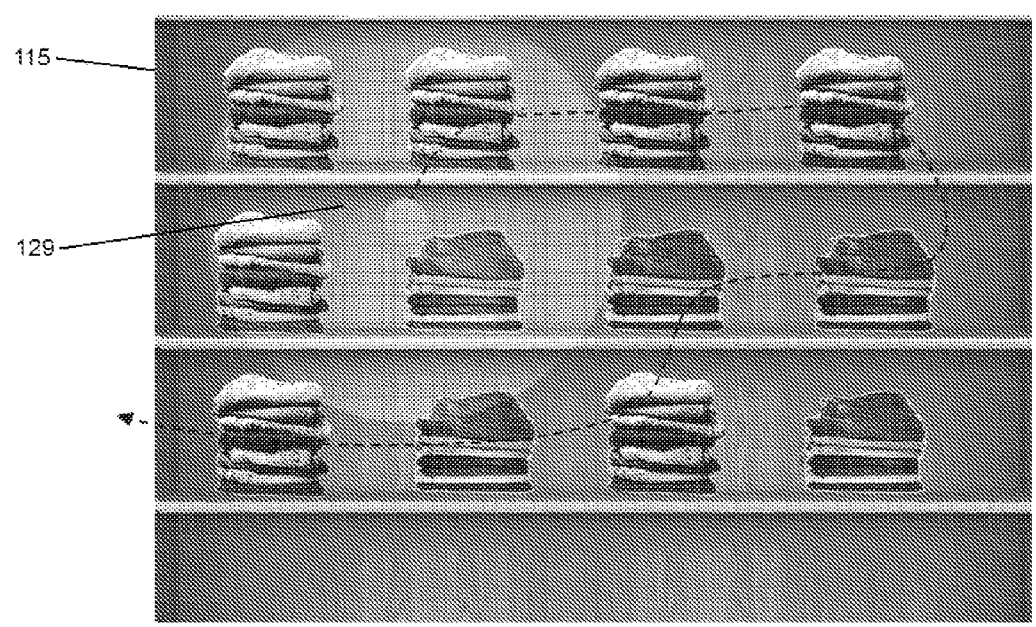

In one embodiment, the RFID reading terminal 100 can be further configured to display an indicator 119 of the RF signal coverage over a scan trace, as schematically shown in FIG. 7. The indicator of the RF signal coverage can be determined as a line being a projection of the 3D RF signal coverage shape onto a plane defined by the physical structure 115 containing the inventory items. In another embodiment, the RFID reading terminal 100 can be further configured to display an indicator 129 of the RF signal coverage over a current position aimed at by the RFID reading terminal, as schematically shown in FIG. 8.

In one embodiment, the RFID reading terminal 100 can be further configured to display a scan trace overlaid over an image of a physical structure (e.g., a shelf) containing one or more scanned items and one or more items to be scanned. In one embodiment, the image of the physical structure containing the inventory items can be received by the RFID reading terminal 100 over the network from an external computer. In another embodiment, the RFID reading terminal 100 can comprise a two-dimensional imager, and the image of the physical structure containing the inventory items can be acquired by the two-dimensional imager. In another embodiment, the image of the physical structure is drawn, with appropriate detail, on the RFID reading terminal display, based on a description of the physical structure received by the terminal 100 via the user interface, from an external peripheral device or from an external computer.

Figure 9:
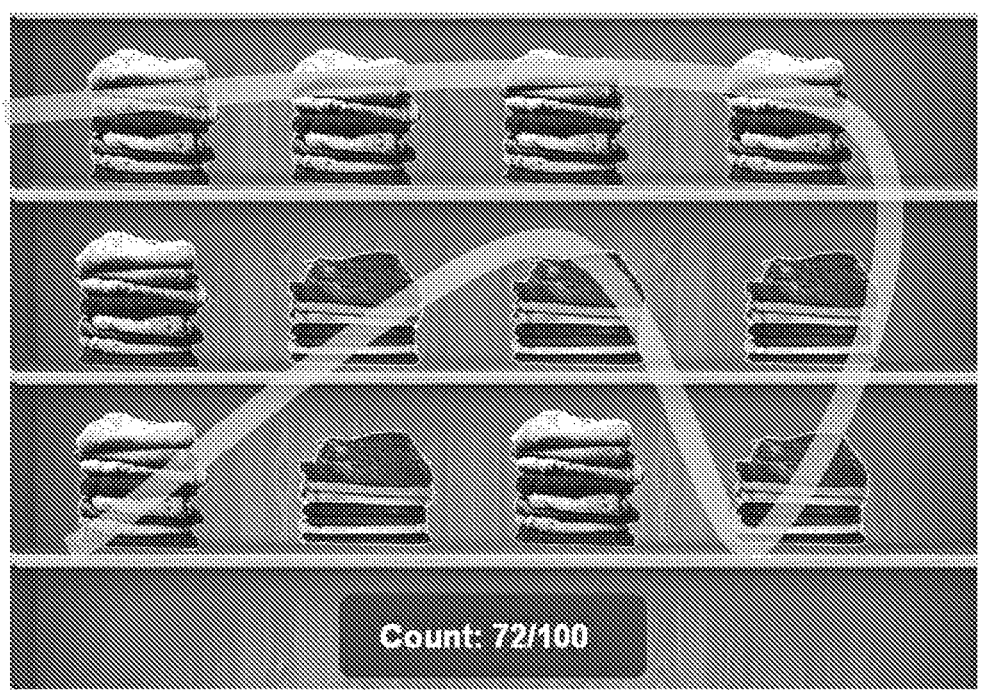
Figure 10:
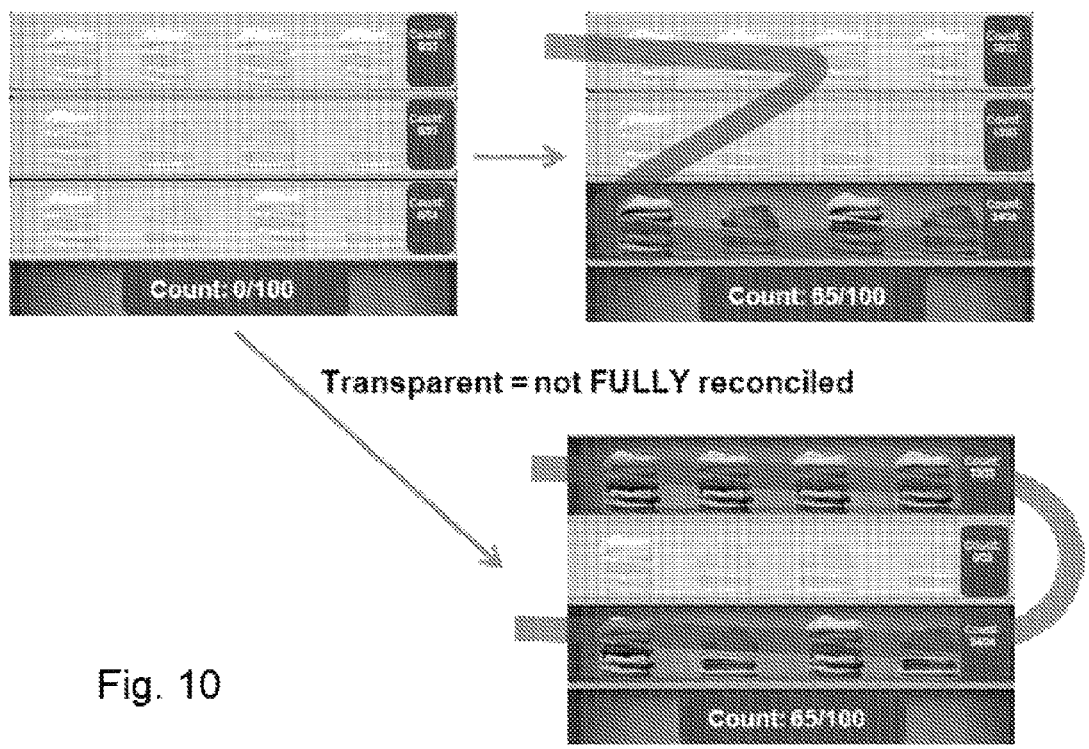
Figure 11:
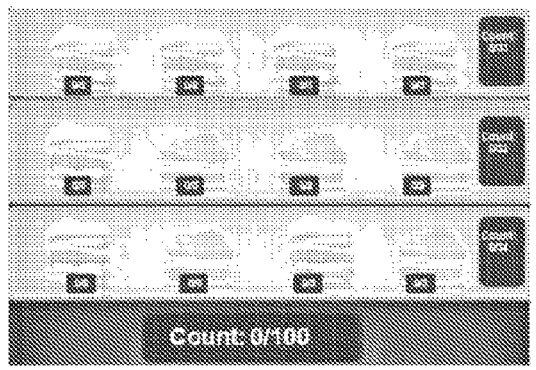
Figure 11:
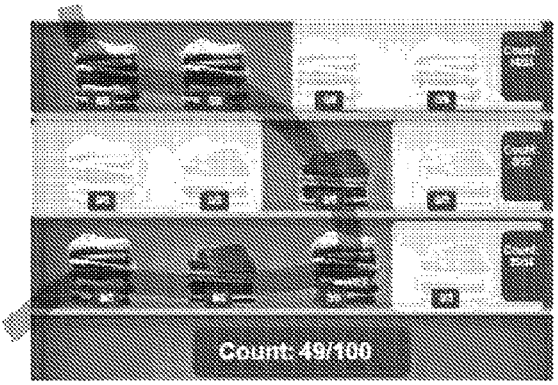
Figure 12:
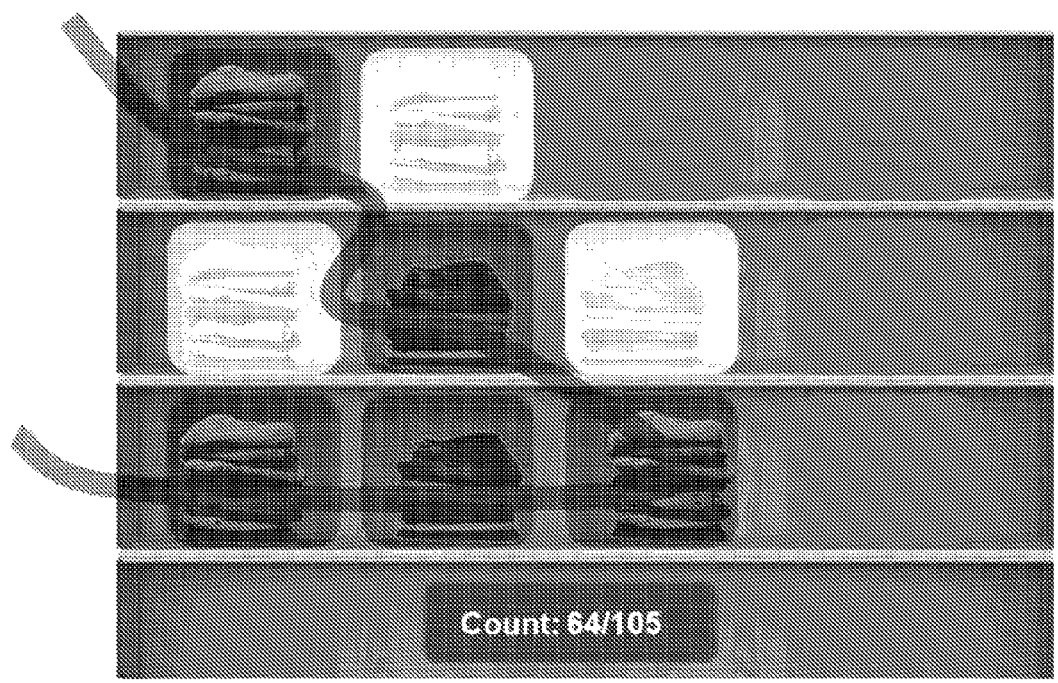
Figure 13:
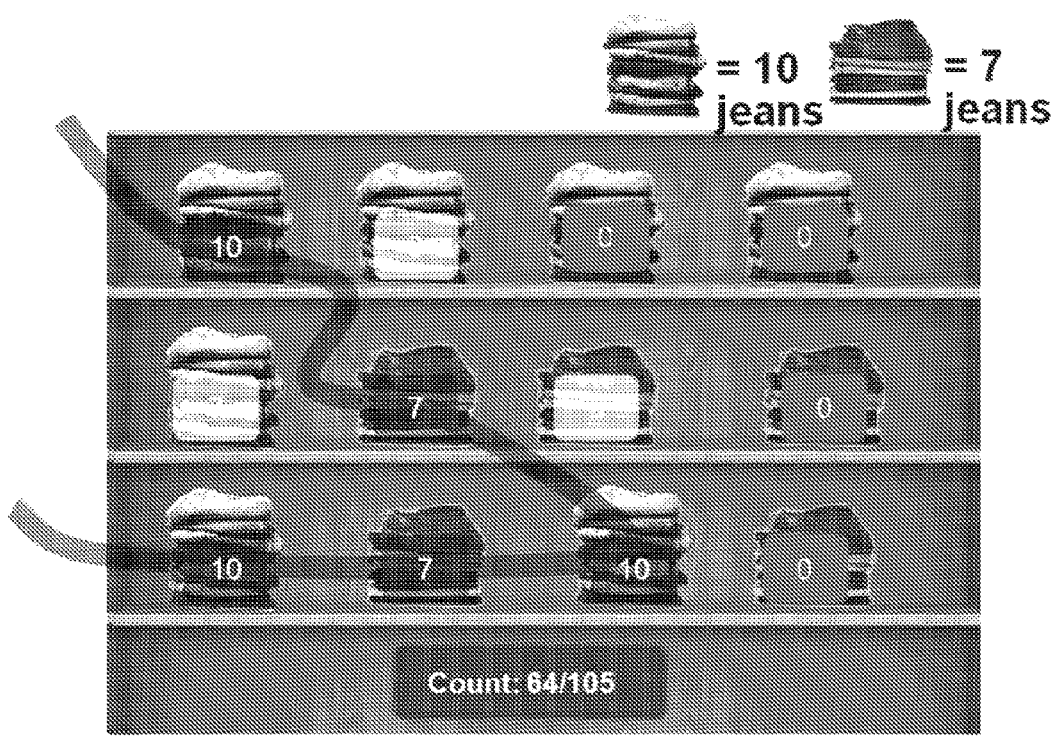
Figure 14:
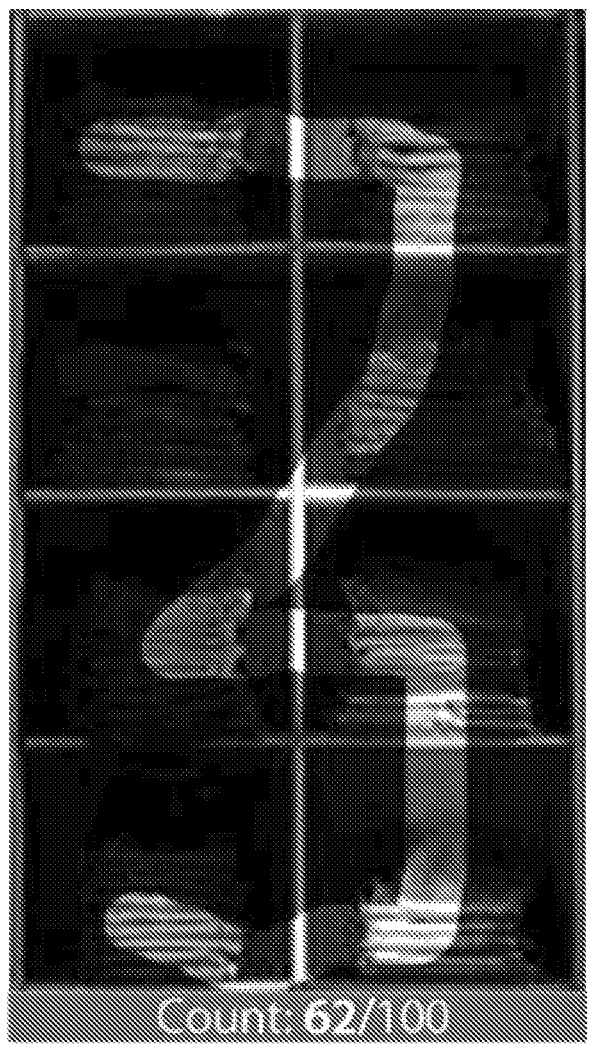
Figure 15:
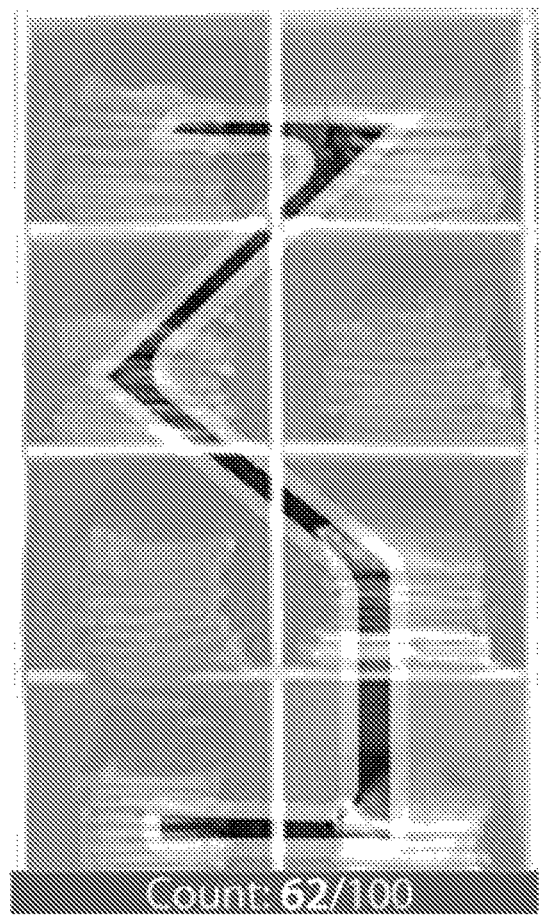
Figure 16:
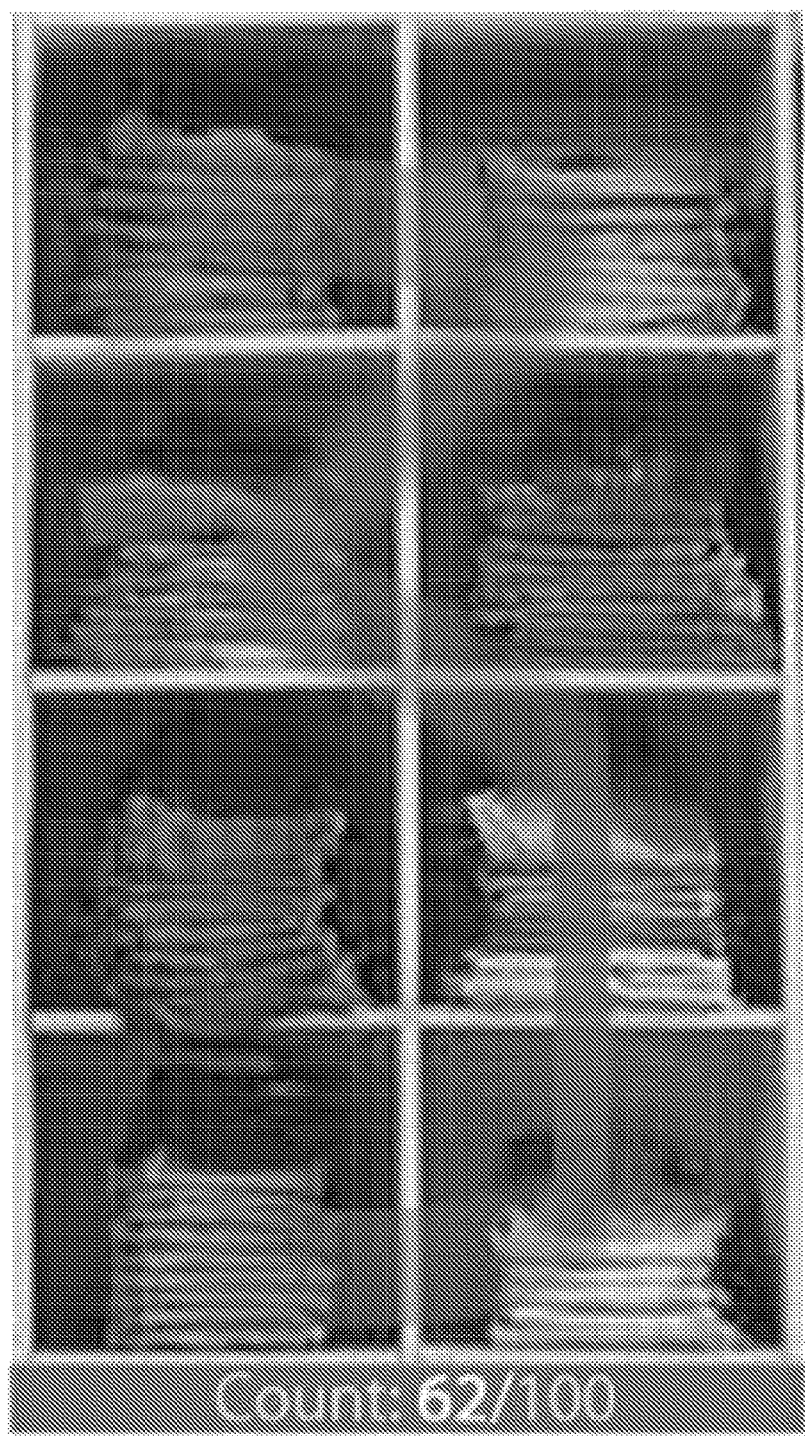
Figure 17:
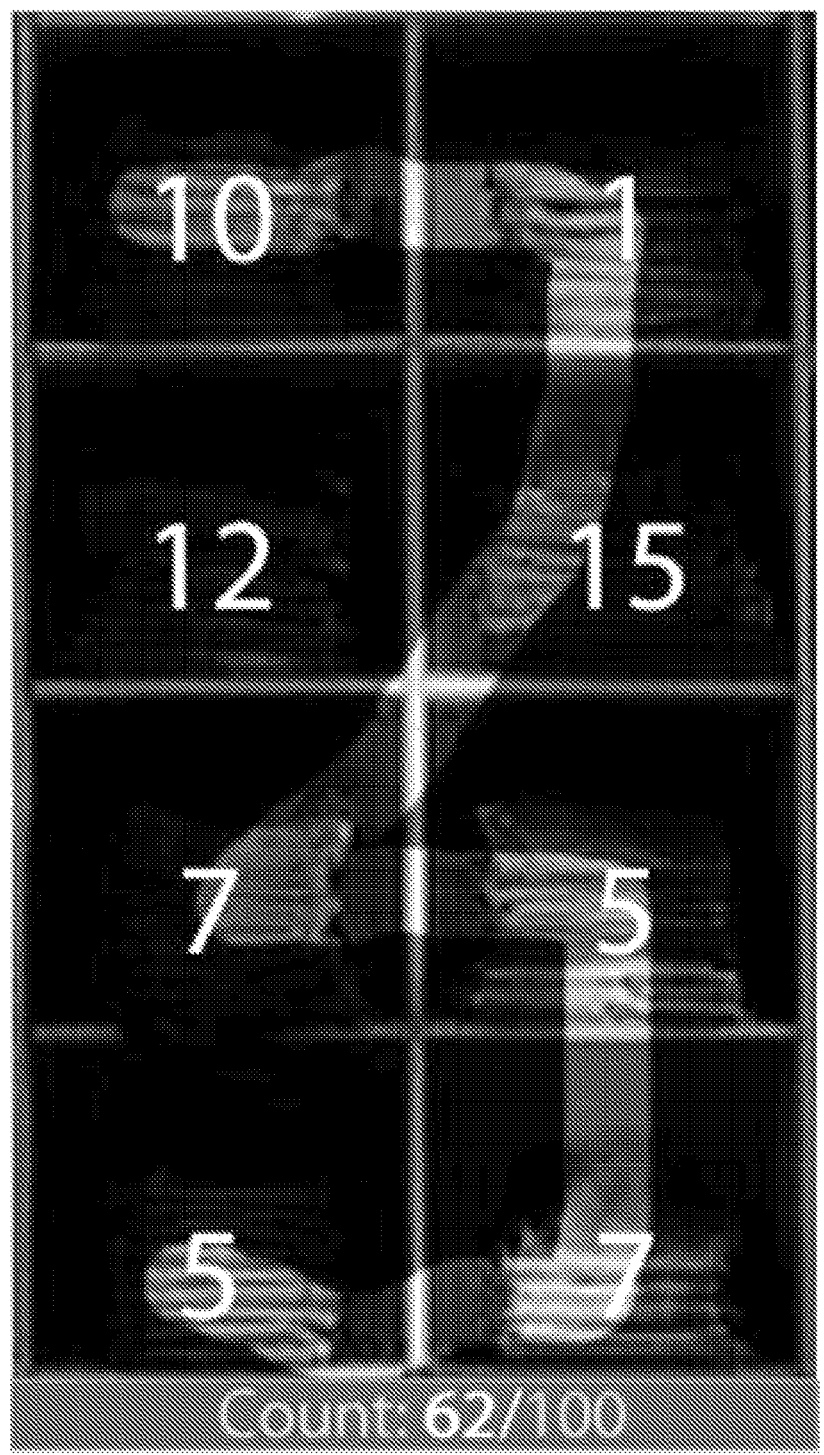
Figure 18:
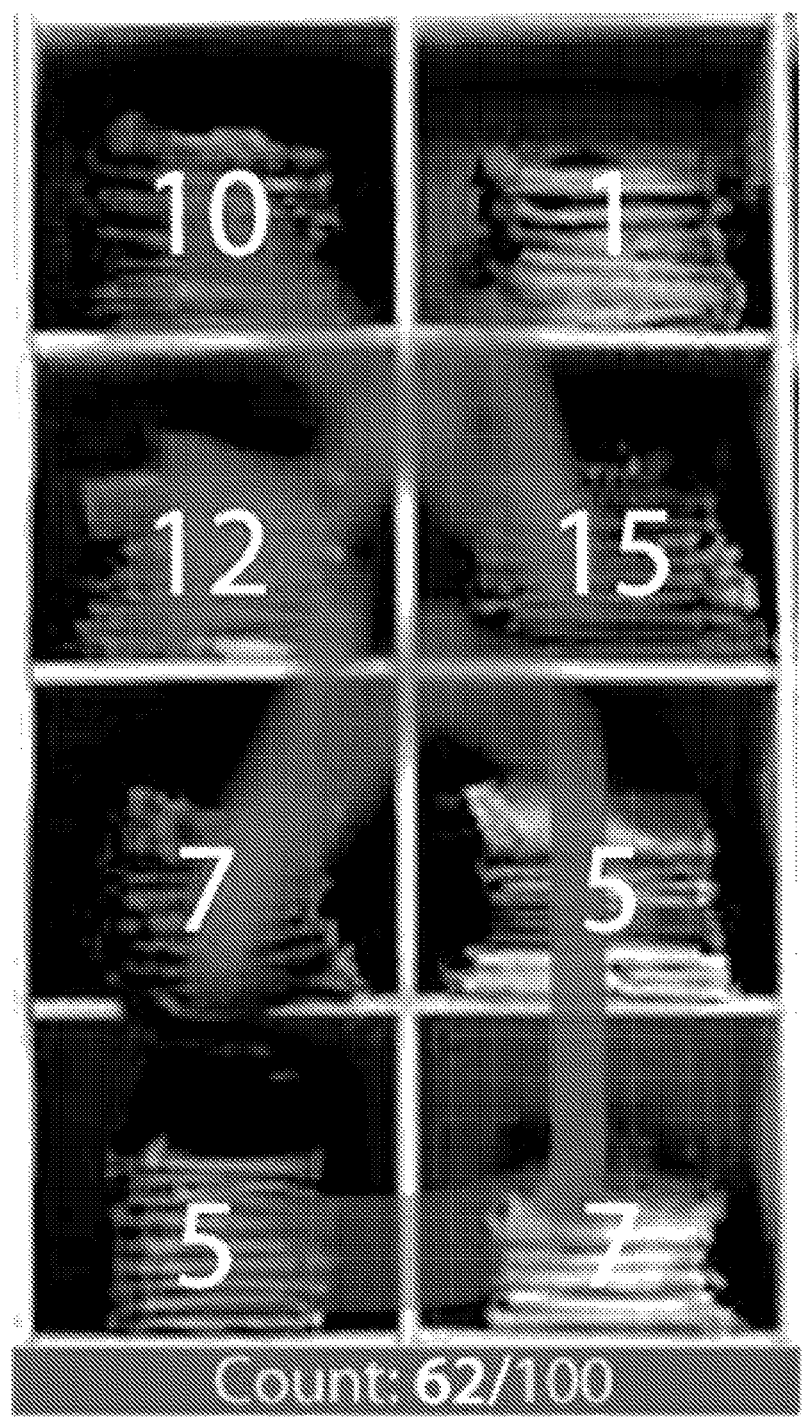
Figure 19:
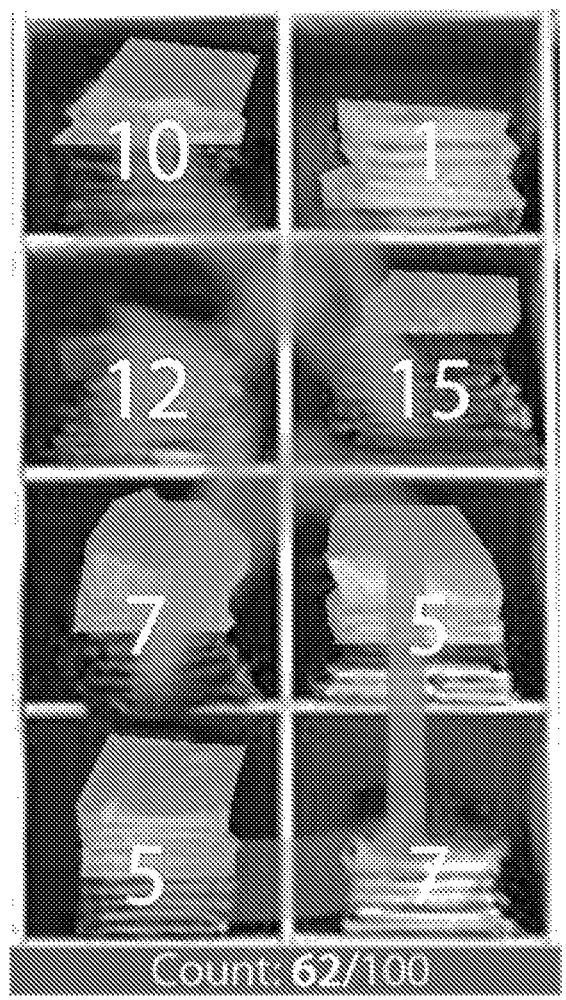

In one embodiment, the items which have already been scanned and which have not yet been scanned can be displayed in two different colors, as schematically shown in FIG. 9. In another embodiment, the items which have already been scanned and which have not yet been scanned can be displayed using two different transparency patterns, as schematically shown in FIGS. 10-11. In one embodiment, a part of the physical structure (e.g., shelves or sections of shelves) containing inventory items having not been fully reconciled against the inventory list can be shown using a transparent pattern. In another embodiment, schematically shown in FIG. 12, multiple colors and/or transparency pattern can be used to display parts of physical structure containing the inventory items which have been fully reconciled, partially reconciled, or containing no items having been reconciled. In a yet another embodiment, schematically shown in FIG. 13, quantities of reconciled items can be displayed associated with groups of inventory items. Various embodiments displaying scan traces and showing the quantities of inventory items by the RFID reading terminal 100 are shown in FIGS. 14-19.

Figure 20A:
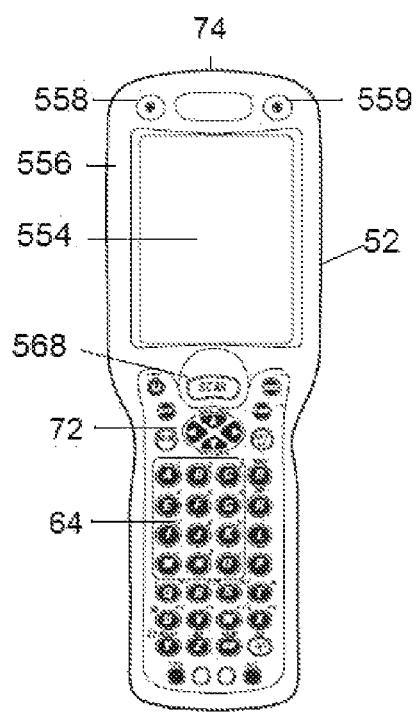
FIGS. 20a-20c schematically illustrate embodiments of an RFID reading terminal.
Figure 20B:
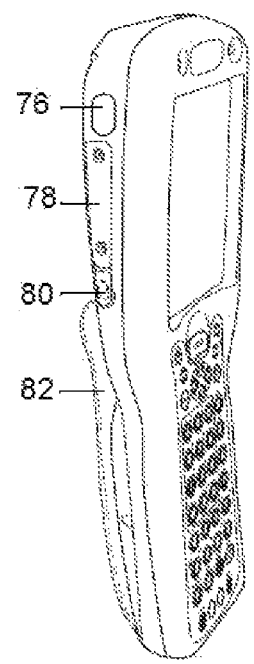
Figure 20C:
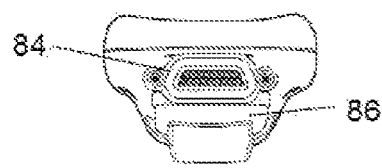

In one embodiment, schematically shown in FIG. 20, the RFID reading terminal 100 can be further configured to receive from an external computer and to display a floor plan of the manufacturing, retail and/or storage facility. The RFID reading terminal can be further configured to display its position on the floor plan. The RFID reading terminal can be further configured to display in two or more different colors one or more areas containing the items which have already been scanned and one or more areas containing the items which have not yet been scanned.

In a further aspect, RFID reading device 333 can be compliant with EPC™ Class-1 Generation-2 UHF RFID Protocol for Communications at 860 MHz-960 MHz by EPCglobal, commonly known as the "Gen 2" standard, which defines physical and logical requirements for a passive-backscatter, interrogator-talks-first (ITF) RFID system operating in the 860 MHz-960 MHz frequency range.

In one embodiment, RFID reading terminal 100 can transmit information to a passive RFID tag by modulating an RF signal in the 860-960 MHz frequency range. An RFID tag can receive both information and operating energy from the RF signal transmitted by the RFID reading terminal 100. RFID reading terminal 100 can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the RFID reading terminal 100. In one embodiment, the RFID tag can modulate the reflection coefficient of its antenna only responsive to receiving an RFID signal from RFID reading terminal 100.

In a further aspect, RFID reading terminal 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tags can receive their operating energy from the same modulated RF carrier.

The RFID reading terminal 100 can be configured to receive information from an RFID tag by transmitting an unmodulated RF carrier and listening for a backscatter reply. RFID tags can transmit information by backscatter-modulating the amplitude and/or phase of the RFID carrier. RFID tags can encode the backscattered data using, e.g., FM0 baseband or Miller modulation of a subcarrier at the data rate. The encoding method to be employed by an RFID tag can be selected by the RFID reading terminal 100.

In another aspect, RFID reading terminal can establish one or more sessions with one or more RFID tags. An RFID tag can support at least one session-dependent flag for every session. The session-dependent flag can have two states. An RFID tag can invert a session-dependent flag responsive to receiving a command from RFID reading terminal 100. Tag resources other than session-dependent flags can be shared among sessions. In another aspect, an RFID tag can support a selected status flag indicating that the tag was selected by the RFID reading terminal 100.

Responsive to receiving an interrogation signal transmitted by the RFID reading terminal 100, an RFID tag can transmit a response signal back to RFID reading terminal 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, RFID reading terminal can implement EPC™ Class-1 Generation-2 UHF RFID Protocol for Communications at 860 MHz-960 MHz by EPCglobal. The RFID reading terminal 100 can interrogate RFID tags using the commands described herein infra.

Select command can be used by the RFID reading terminal 100 to select a particular RFID tag population for the subsequent inventory round. Select command can be applied successively to select a particular tag population based on user-specified criteria. Select command can include the following parameters:
  Target parameter indicates whether Select command modifies a tag's SL flag or Inventoried flag, and in the latter case it further specifies one of four available sessions (S0, . . . , S3);
  Action parameter indicates whether matching tags assert or deassert SL flag, or set their Inventoried flag to A or B state; tags conforming to the contents of MemBank, Pointer, Length, and Mask parameters are considered to be matching;
  Mask parameter contains a bit string that a tag should compare to a memory location specified by MemBank, Pointer, and Length parameters;
  MemBank parameter specifies the memory bank to which Mask parameter refers (EPC, TID, or User);
  Pointer parameter specifies a memory start location for Mask;
  Length parameter specifies the number of bits of memory for Mask; if Length is equal to zero, all tags are considered matching.

Inventory command set can be used by the RFID reading terminal 100 to single out one or more individual tags from a group. A tag can maintain up to four simultaneous sessions and a binary Inventoried flag for each session. Inventory command set includes the following commands:
  Query command can be used to initiate and specify an inventory round; it contains a slot counter value (Q=0 to 15) determining the number of slots in the round; the command also includes Sel parameter specifying which tags should respond to the Query.
  QueryAdjust command can be used to adjust the value of the tag's slot counter Q without changing any other parameters;
  QueryRep command can be used to repeat the last Query command;
  Ack command can be used to acknowledge a tag's response;
  NAK command can be used to force a tag to change its state to Arbitrate.

An RFID tag can implement a state machine. Once energized, a tag can change its current state to Ready. A selected tag can, responsive to receiving Query command, select a random integer from the range of $[0; 2^{Q-1}]$. If the value of zero is selected, the tag can transition to Reply state, backscattering a 16-bit random number. If a non-zero value is selected, the tag can load the selected random integer into its slot counter and change its state to Arbitrate.

Responsive to receiving the tag transmission, RFID reading terminal can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of $[0; 2^{Q-1}]$, load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, RFID reading terminal can send a QueryAdjust command causing the tag to invert its Inventoried flag and to transition to Ready state.

Access command set can be used by the RFID reading terminal 100 for communicating with (reading from and writing to) a tag. An individual tag must be uniquely identified prior to access. Access command set includes the following commands:
  ReqRn command can be used by the RFID reading terminal 100 to request a handle from a tag; the handle can be used in the subsequent Access command set commands. Responsive to receiving Req_RN commands, a tag returns a 16-bit random integer (handle) and transitions from Acknowledged to Open or Secured state.
  Read command can be used by the RFID reading terminal 100 to read tag's Reserved, EPC, TID and User memory;
  Write command can be used by the RFID reading terminal 100 to write to tag's Reserved, EPC, TID and User memory;
  Kill command can be used by the RFID reading terminal 100 to permanently disable a tag;
  Lock command can be used by the RFID reading terminal 100 to lock passwords preventing subsequent read or write operations; lock individual memory banks preventing subsequent write operations; permanently lock the lock status of passwords or memory banks;
  Access command can be used by the RFID reading terminal 100 to cause a tag having a non-zero access password to transition from Open to Secured state.

A skilled artisan would appreciate the fact that other methods of interrogating RFID tags by the RFID reading terminal 100 are within the scope of this disclosure.

One embodiment of the RFID reading terminal 100 is schematically shown in FIGS. 21a (front panel view), 21b (side panel view), and 21c (bottom panel view). The RFID reading terminal 100 can comprise a housing 52 within which other components of the RFID reading terminal 100 can be disposed. An LCD screen display with a touch screen sensor 554 can be disposed on the front panel 556. Also disposed on the front panel 556 can be a decode LED 558, a scan LED 559, and a keyboard 64 including a scan key 568 and navigation keys 72. An imaging window 74 can be disposed on the top panel of housing 52. Disposed on the side panel (best viewed in FIG. 21b) can be an infra-red communication port 76, an access door to a secure digital (SD) memory interface 78, an audio jack 80, and a hand strap 82. Disposed on the bottom panel (best viewed in FIG. 22c) can be a multi-pin mechanical connector 84 and a hand strap clip 86. RFID reading device (not shown in FIGS. 21a-21c) can be disposed within the housing 52.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems, methods, and apparata that are described herein is as follows:

A1. A portable radio-frequency identifier (RFID) reading terminal comprising:
a microprocessor;
a memory;
an RFID reading device comprising a radio frequency (RF) antenna;
a display;
wherein said portable RFID reading terminal is configured to display a scan trace; and
wherein said scan trace is provided by a line comprising a plurality of time varying points, each point being defined by a projection of a coverage shape of an RF signal transmitted by said RFID reading device onto a chosen plane at a given moment in time.

A2. The portable RFID reading terminal of (A1), wherein said portable RFID reading terminal is configured, by reading RFID tags attached to said items, to reconcile an inventory of items stored in a facility against at least one of: an expected inventory list, an expected count of items.

A3. The portable RFID reading terminal of (A1), wherein said portable RFID reading terminal is configured, by reading RFID tags attached to said items, to reconcile an inventory of items stored in a facility against at least one of: an expected inventory list, an expected count of items; and
wherein said RFID terminal is configured to receive from an external computer at least one of: said expected inventory list, said expected count of items.

A4. The portable RFID reading terminal of (A1), further comprising a user interface;
wherein said portable RFID reading terminal is configured, by reading RFID tags attached to said items, to reconcile an inventory of items stored in a facility against at least one of: an expected inventory list, an expected count of items; and
wherein said RFID terminal is configured to receive via said user interface at least one of: said expected inventory list, said expected count of items.

A5. The portable RFID reading terminal of (A1), further comprising a two-dimensional imager;
wherein said portable RFID reading terminal is configured, by reading RFID tags attached to said items, to reconcile an inventory of items stored in a facility against at least one of: an expected inventory list, an expected count of items; and
wherein said RFID terminal is configured to receive via said two-dimensional imager at least one of: said expected inventory list, said expected count of items.

A6. The portable RFID reading terminal of (A1), wherein said portable RFID reading terminal is configured, by reading RFID tags attached to said items, to reconcile an inventory of items stored in a facility against at least one of: an expected inventory list, an expected count of items; and
wherein said RFID terminal is configured to receive from an external memory device at least one of: said expected inventory list, said expected count of items.

A7. The portable RFID reading terminal of (A1), wherein said portable RFID reading terminal is configured, by reading RFID tags attached to said items, to reconcile an inventory of items stored in a facility against at least one of: an expected inventory list, an expected count of items; and
wherein said RFID terminal is configured to receive from a first external computer at least one of: said expected inventory list, said expected count of items; and
wherein said RFID terminal is further configured to transmit to a second external computer at least one of: a list of read RFID tags, a count of read RFID tags.

A8. The portable RFID reading terminal of (A1), further comprising a two-dimensional imager;
wherein said portable RFID reading terminal is further configured to determine a spatial position of said RF signal coverage shape based on a known position and orientation of said RF antenna relatively to a position of a field of view of said two-dimensional imager.

A9. The portable RFID reading terminal of (A1), further comprising a two-dimensional imager;
wherein said portable RFID reading terminal is further configured to measure a distance to an object using said two-dimensional imager; and
wherein said portable RFID reading terminal is further configured to determine and display a projection of said RF signal coverage shape onto the plane defined by a physical structure.

A10. The portable RFID reading terminal of (A1), further comprising at least one accelerometer;
wherein said portable RFID reading terminal is further configured to determine a change of a spatial position and orientation of said RF signal coverage shape based on proper acceleration values received from said at least one accelerometer.

A11. The portable RFID reading terminal of (A1), wherein said portable RFID reading terminal is further configured to display at least one of: a quantity of scanned items, a quantity of items which have not be scanned yet, a total quantity of items to be scanned.

A12. The portable RFID reading terminal of (A1), wherein said portable RFID reading terminal is further configured to display an indicator of a ratio of quantity of scanned items to a total quantity of items to be scanned.

A13. The portable RFID reading terminal of (A1), wherein said portable RFID reading terminal is further configured to display said scan trace overlaid over an image of a physical structure.

A14. The portable RFID reading terminal of (A1), wherein said portable RFID reading terminal is further configured to receive an image of a physical structure; and wherein said portable RFID reading terminal is further configured to display said scan trace overlaid over said image of said physical structure.

A15. The portable RFID reading terminal of (A1), wherein said portable RFID reading terminal is further configured to receive a description of a physical structure;

wherein said portable RFID reading terminal is further configured to create an image of said physical structure based on said description; and wherein said portable RFID reading terminal is further configured to display said scan trace overlaid over said image of said physical structure.

A16. The portable RFID reading terminal of (A1), further comprising a two-dimensional imager;

wherein said portable RFID reading terminal is further configured, using said two-dimensional imager, to acquire an image of a physical structure; and wherein said portable RFID reading terminal is further configured to display said scan trace overlaid over said image of said physical structure.

A17. The portable RFID reading terminal of (A1), wherein said portable RFID reading terminal is further configured to display an indicator of an RF signal coverage over said scan trace overlaid over an image of a physical structure.

A18. The portable RFID reading terminal of (A1), wherein said portable RFID reading terminal is further configured to display a indicator of an RF signal coverage over a current position within said scan trace.

The invention claimed is:

1. A method comprising:
    outputting a radio-frequency (RF) signal from an radio-frequency identifier (RFID) reader;
    displaying a scan trace in response to the outputting the RF signal, wherein the scan trace comprises a plurality of points recorded over a period of time that thereby defines a path of a projection of the RF signal transmitted by an RFID antenna over the period of time in a spatial area.

2. The method of claim 1, further comprising reconciling, by reading RFID tags attached to items, an inventory of items stored in a facility against at least one of: an expected inventory list and an expected count of items.

3. The method of claim 2, further comprising receiving, by the RFID reader from an external computer, at least one of: the expected inventory list and the expected count of items.

4. The method of claim 3, further comprising receiving via the user interface at least one of the expected inventory list and the expected count of items.

5. The method of claim 3, further comprising receiving via the two-dimensional imager at least one of the expected inventory list and the expected count of items.

6. The method of claim 2, further comprising receiving from an external memory device at least one of: (1) the expected inventory list and (2) the expected count of items.

7. The method of claim 3, further comprising transmitting, to a second external computer, at least one of: a list of read RFID tags and a count of read RFID tags.

8. The method of claim 1, further comprising displaying the scan trace on a display of the RFID reader.

9. The method of claim 1,
    wherein each point is defined by a projection of a coverage shape of an RF signal transmitted by the RFID antenna onto the plane at a given moment in time, and
    wherein a spatial position of the coverage shape of the RF signal is determined based on a known position and orientation of the RF antenna relatively to a position of a field of view of the two-dimensional imager.

10. The method of claim 1,
    wherein each point is defined by a projection of a coverage shape of an RF signal transmitted by the RFID antenna onto a plane at a given moment in time,
    wherein a distance to an object is measured using a two-dimensional imager; and
    wherein a projection of the RF signal coverage shape determined and displayed onto the plane defined by a physical structure.

11. The method of claim 1,
    wherein each point is defined by a projection of a coverage shape of an RF signal transmitted by the RFID antenna onto a plane at a given moment in time, and
    wherein a change of a spatial position and orientation of the RF signal coverage shape is determined based on proper acceleration values received from at least one accelerometer.

12. The method of claim 1, further comprising displaying at least one of the following: a quantity of scanned items, a quantity of items which have not be scanned yet, and a total quantity of items to be scanned.

13. The method of claim 1, further comprising displaying an indicator of a ratio of quantity of scanned items to a total quantity of items to be scanned.

14. Thy method of claim 1, further comprising displaying the scan trace overlaid over an image of a physical structure.

15. The method of claim 14, further comprising receiving the image of the physical structure from a camera on the RFID reader.

16. The method of claim 1, further comprising:
    receiving a description of a physical structure;
    creating an image of the physical structure based on the description; and
    displaying the scan trace is displayed overlaid over the image of the physical structure.

17. The method of claim 1, further comprising
    acquiring, using a two-dimensional imager, an image of a physical structure; and
    displaying the scan trace overlaid over the image of the physical structure.

18. The method of claim 1, further comprising displaying an indicator of an RF signal coverage over the scan trace overlaid over an image of a physical structure.

19. The method of claim 1, further comprising displaying an indicator of an RF signal coverage over a current position within the scan trace.

20. An radio-frequency identifier (RFID) reader comprising:
    a radio frequency (RF) antenna that outputs an RF signal;
    wherein a scan trace is displayed in response to the outputting the RF signal, wherein the scan trace comprises a plurality of points recorded over a period of time that thereby defines a path of a projection of the RF signal transmitted by the RFID antenna over the period of time in a spatial area.

* * * * *